United States Patent [19]

D'Andrea

[11] Patent Number: 5,087,131
[45] Date of Patent: Feb. 11, 1992

[54] THREE PIECE ROD END
[75] Inventor: Peter D'Andrea, Fairfield, Conn.
[73] Assignee: Imo Industries Inc., Lawrenceville, N.J.
[21] Appl. No.: 604,878
[22] Filed: Oct. 29, 1990
[51] Int. Cl.$^5$ ............................................. F16C 25/04
[52] U.S. Cl. .................................. 384/208; 384/210; 29/898.051
[58] Field of Search ................. 384/192, 203–210, 384/213; 29/898.043, 898.044, 898.045, 898.048, 898.051

[56] References Cited

U.S. PATENT DOCUMENTS

| | | |
|---|---|---|
| 2,366,668 | 1/1945 | Heim . |
| 2,380,150 | 7/1945 | Collito ................................ 384/210 |
| 2,400,506 | 5/1946 | Heim ................................. 384/208 |
| 2,665,956 | 1/1954 | Heim . |
| 2,675,279 | 4/1954 | Heim . |
| 2,701,409 | 2/1955 | Heim ............................. 29/898.051 |
| 2,759,244 | 8/1956 | Heim ............................. 384/206 X |
| 2,894,789 | 7/1959 | Tracy ................................ 384/208 |
| 2,906,568 | 9/1959 | Gray . |
| 3,583,775 | 6/1971 | Potter ............................... 384/208 |
| 3,589,779 | 6/1971 | Sokol ............................... 384/208 |
| 3,897,616 | 8/1975 | Williams ...................... 29/898.051 |
| 3,992,066 | 11/1976 | McCloskey . |
| 4,076,343 | 2/1978 | McCloskey . |
| 4,116,504 | 9/1978 | Cass ................................. 384/210 |
| 4,450,703 | 5/1984 | McCloskey ....................... 72/342 |

FOREIGN PATENT DOCUMENTS

| | | | |
|---|---|---|---|
| 19379 | 7/1970 | Japan | .............................. 29/898.044 |
| 33643 | 10/1971 | Japan | .............................. 29/898.044 |

Primary Examiner—Thomas R. Hannon
Attorney, Agent, or Firm—James Creighton Wray

[57] ABSTRACT

A three piece spherical bearing has a race having two axial halves. One axial half has a spherical bore. The other axial half has a bore which tapers radially outward and axially inward at an angle of about 11° or more to an axial direction. The tapered wall has one or more annular depressions with radial walls and walls at angles to the radial walls. A ball having a spherical outer surface and an axial bore is placed in the race. An insert having a curved inner surface and having an outer surface with a diameter slightly less than the minimum diameter of the tapered wall is pressed into the race and is expanded around the ball into contact with the tapered wall. Forces which tend to force the insert cause sharp linear pointed surfaces at the insert of the tapered wall and radial walls of the grooves to bite into the outer surface of the insert, tightly gripping the insert within the race and holding the three part spherical bearing together. Ridges and grooves provided in the outer surface of the insert deform into engagement with the grooves in the insert-receiving tapered wall and increase axial strength of the bearing.

12 Claims, 3 Drawing Sheets

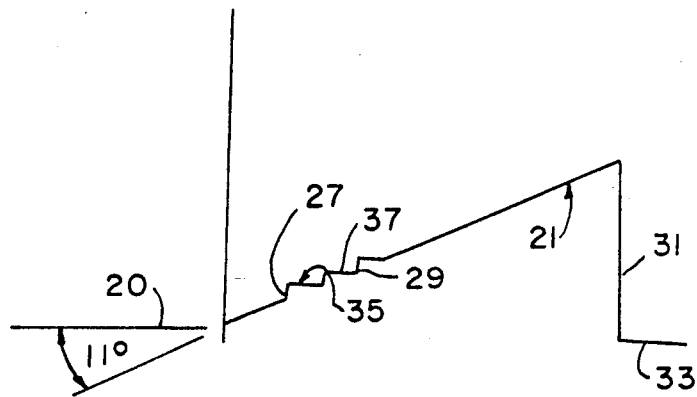
FIG. 6
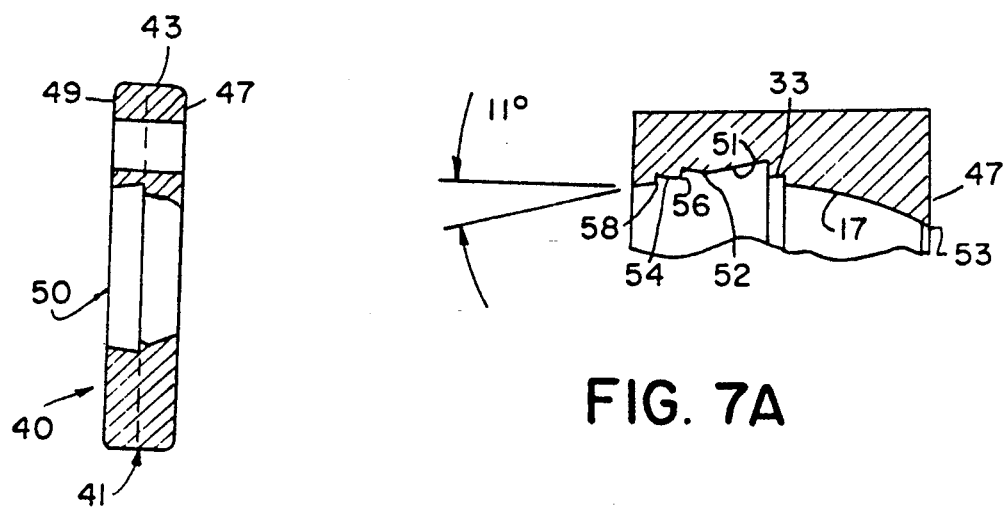
FIG. 7
FIG. 7A

5,087,131

THREE PIECE ROD END

BACKGROUND OF THE INVENTION

This invention concerns spherical bearings.

Spherical bearings are widely used in linkages of mechanical controls. Aircraft use hundreds of spherical bearings to provide linear movements in pushing or pulling links.

Tolerances between parts and the maintenance of those tolerances during usage are important to the effectiveness of spherical bearings.

Many types of spherical bearings have been designed and are in use. Outer races are most commonly rod ends or circular o other shaped races which are provided with fasteners to attach to other elements. Rod ends have a circular race at one end and a rod at the other. Usually the rod end has a male or female thread for attaching to a complementary thread at the end of a rod. Many forms of holding a ball within the race have been developed. The art of spherical bearings is crowded and minor changes to the art provide significant contributions.

Some spherical bearings have outer races which are deformed inwardly about a ball to provide a concave spherical surface in which the ball rotates.

Other spherical bearings have races in which sections of the race are assembled after the ball is inserted in the race. Some spherical bearings to which the present invention is particularly related have races which are formed in two axial halves. One half has a spherical surface for receiving an outer surface of a ball. The other half has a tapered surface for receiving and holding an insert which is pressed into the outer race and against the sloping surface. This invention provides an improvement in such spherical bearings.

SUMMARY OF THE INVENTION

The present invention provides improved strength in three-part spherical bearings with expanded inserts.

A three piece spherical bearing has a race having two axial halves. One axial half has a spherical bore. The other axial half has a bore which tapers radially outward and axially inward at an angle of about 11° or more to an axial direction. The tapered wall has one or more annular depressions with radial walls and walls at angles to the radial walls. A ball having a spherical outer surface and an axial bore is placed in the race. An insert having a curved inner surface and having an outer surface with a diameter slightly less than the minimum diameter of the tapered wall is pressed into the race and is expanded around the ball into contact with the tapered wall. Grooves and ridges on the outer wall of the insert cooperate with grooves in the race when the insert is pressed into the race. Forces which tend to force the insert cause sharp linear pointed surfaces at the insert of the tapered wall and radial walls of the grooves to bite into the outer surface of the insert, tightly gripping the insert within the race and holding the three part spherical bearing together.

A bearing has a rod end body, an enlarged head on the rod end body, and an opening in the head for receiving a ball. The opening has one curved side for holding one side of a ball, and a side with an enlarged bore for receiving an insert for holding the ball. A deformable insert has a generally cylindrical shape with an outer surface and an inner surface. The outer surface deforms against the second sloped portion of the opening in the rod end and the inner surface deforms against the ball. The improvement comprises internal grooves in a wall of the second portion of the opening in the rod end for digging into the insert as the insert is expanded by pressure of a ball into the second portion of the opening. In one embodiment, grooves and ridges in the outer wall of the insert deform and engage grooves in the race as the insert is pressed into the race.

The grooves comprise plural annular grooves which extend around the second portion of the opening.

The improvement comprises one or more grooves cut into a sloped wall of the second portion of the opening.

The grooves have generally radial faces and generally axial faces, with linear intersections between the faces forming points for digging into the insert.

The sloping wall of the second portion of the opening slopes inward and outward at about 11° to an axial line.

The plural annular grooves comprise plural grooves which have generally radial walls, and sloped walls which slope at about 30° to an axial direction.

The grooves are spaced along the sloping wall of the second portion of the opening.

In one embodiment, one or more ridges or grooves are formed in an outer wall of the insert.

A preferred spherical bearing includes a race having a ball-receiving opening made of two sections separated by a stepped outward annular lubrication groove. The first section has a radiused wall centered about a center of the opening for receiving a ball. The second section has a sloped wall, which slopes at about 11° or more with respect to an axis of the opening, and extends from an inner limit spaced radially outward from the lubrication groove. The sloped wall of the second section terminates outward at a face of the race, a ball for inserting in the opening and contacting the first curved surface of the first section of the opening, and an insert for inserting with the ball in the second section of the opening. The insert has a generally cylindrical outer surface and a curved inner surface for deflecting the outer surface radially outward into contact with the sloped surface of the second portion of the opening as the insert and the ball are forced into the race, and for deforming the inner surface of the insert to conform with the ball as the outer surface of the insert is forced outwardly into contact with a slipping surface of the second section of the opening.

The sloping line in the second section intersects an axial face of the race in a circular line, and 0.0045" per side is allowed between a cylindrical wall of the insert and the circle at the inner section of the face of the race and the sloping wall.

In one embodiment, the insert outer wall is grooved to interengage grooves in the section of the race when the insert is deformed into the race about a ball.

These and further and other objects and features of the invention are apparent in the disclosure, which includes the above and ongoing written specification, with the claims and the drawings.

BRIEF DESCRIPTION OF THE DRAWINGS

FIG. 6 is a fragmentary detail of another race of the present invention.

FIG. 7 is a cross-sectional detail of an alternate race.

FIG. 7A is a detail of the central bore.

DETAILED DESCRIPTION OF THE DRAWINGS

Figure 1:
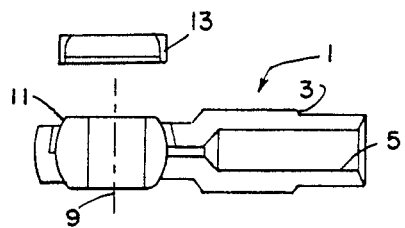
FIG. 1 is a side elevation partially in section of a rod end body, ball and insert.
Figure 2:
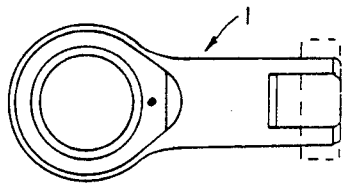
FIG. 2 is a top elevation of the rod end shown in FIG. 1.
Figure 3:
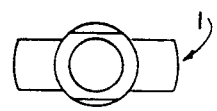
FIG. 3 is an end view of the rod end shown in FIGS. 1 and 2.

Referring to the drawings, a spherical bearing is generally indicated by the numeral 1. The bearing is mounted in rod end 3 which has a threaded longitudinal bore 5 for receiving the threaded end of a control rod. The head 7 of the rod has an opening along axis 9 for receiving a ball 11 and an insert 13.

Figure 4:
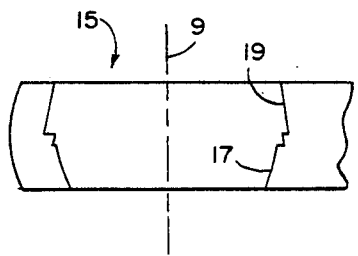
FIG. 4 is a detail of one form of the rod end race.

FIG. 4 shows a detail of the opening 15 along the axis 9. A first portion 17 of the opening has a spherical surface for receiving half of the ball. The other portion 19 of the opening 15 has a sloped wall for holding the insert 13 as the insert is forced axially into the opening and is forced radially outward by the ball 11.

Figure 5:
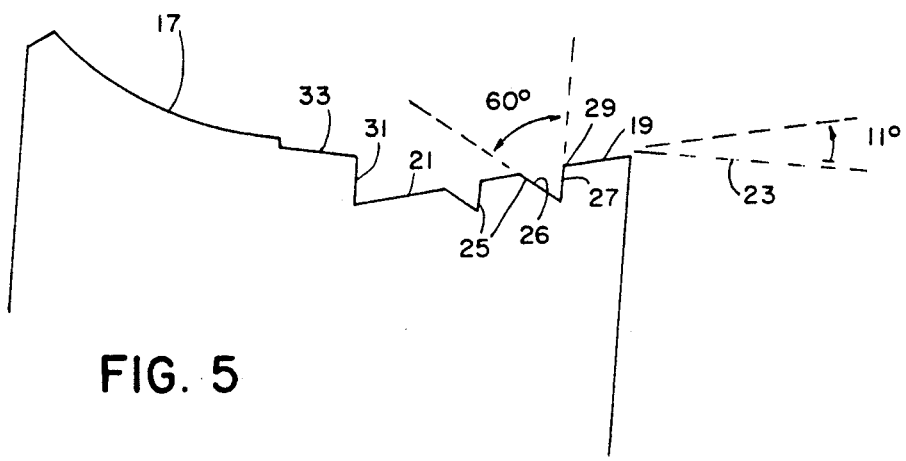
FIG. 5 is a fragmentary detail of a rod end race bore of the present invention.

As shown in FIG. 5, the tapered opening 19 is formed with a frustoconical wall 21, which has an angle of 11° or more with respect to an axial line 23. In the preferred embodiment, one or more grooves 25 are formed in the surface 21. The grooves 25 have a sloped surface 26 and a radial surface 27, which forms a sharp edge 29 for gripping the deformed insert against forces which tend to dislodge the insert after the bearing has been assembled.

The insert is pressed into contact with the internal radial wall 31. The step 33 provides a central lubricant distribution groove around the race between the ball and the race to lubricate the ball, so as the ball turns within the race it tends to distribute lubricant over the spherical concave surface 17 of the race and the inner surface of the insert.

FIG. 6 shows an alternate form of the invention in which elements similar to FIG. 5 are identically numbered. Sloping surface 21 slopes at an angle of 11° to the axial direction 20. An inner wall 31 and lubricant distributing groove 33 are provided in a central portion of the race. Two gripping grooves 35 are provided in surface 21. The gripping grooves include radial walls 27 and generally axial walls 37. Sharp lines 29 are formed at intersections of the sloping wall 21 and the radial walls 27 to dig into the outer surface of the insert as it is deformed upon assembly, and to cooperate with the 11° angle to resist forces between the ball and race which would tend to move the insert in the direction of the radial outer wall 39 of the race.

Figure 8:
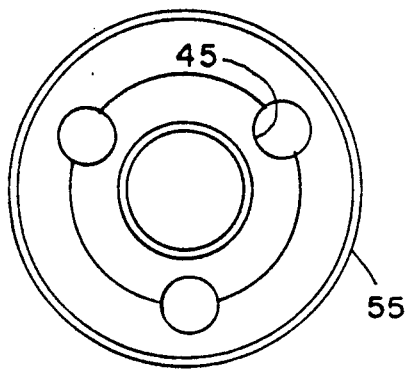
FIG. 8 is a side elevation of the race shown in FIG. 7.

As shown in FIGS. 7, 7A and 8, the bearing of the present invention may be configured with a race for attaching to some object other than a round end. The race 40 is made of a cylindrical body 41 with an outer cylindrical surface 43.

Three axial bolt holes 45 extend through the body 41 for attaching the bearing assembly to an object. Axial sides 47 and 49 extend between the cylindrical outer surface 43 and the central bore 50. Bore 50 has two portions, a sloping insert-receiving wall 51 with elements similar to those described with respect to FIG. 6, and a spherical ball-receiving wall 17. Wall 51 has grooves 52 and 54, which receive expanded portions of the insert, and points 56 and 57, which dig into the insert.

A groove 33 separates the spherical surface 17 from the insert-receiving bore portion 51. A chamfer 53 separates the outer edge of the cylindrical surface 17 and the radial outer surface 47. Chamfers 55 extend around the periphery of the bearing 40 between the lateral surfaces 47 and 49 and the cylindrical outer surface 43.

Figure 9:
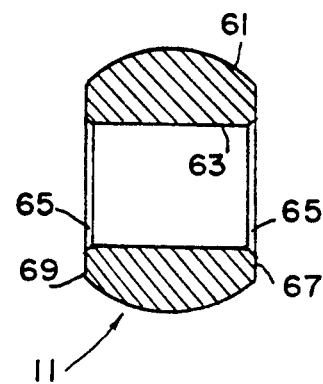
FIG. 9 is a detail of a ball used in the present invention.

FIG. 9 is a cross-sectional view of a ball 11 used in the present invention. The ball has a spherical outer surface 61, a central axial bore 63 through which an element to be moved is fastened, and chamfers 65 interconnecting the central bore 63 and outer radial surfaces 67 and 69.

Figure 10:
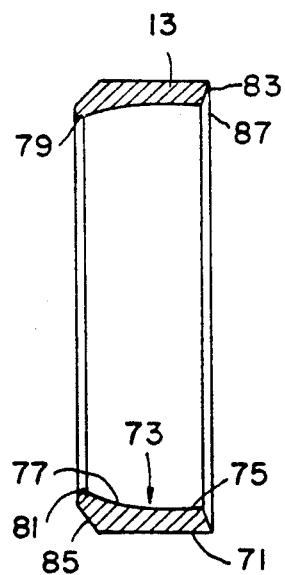
FIG. 10 is a detail of an insert used with the ball and the race of the present invention.

The insert 13 used with the present invention is shown in FIG. 10. The insert has a cylindrical outer wall 71 and an inner wall 73 which is formed of a first portion 75 having a generally axial wall, and a second portion 77 having a generally spherical wall. An axial wall 79 extends outward from the spherical wall 77 to a short radial wall 81. A chamfer 83 connects the radial wall 81 and the outer wall 71. A sloped wall 85 is provided between the outer wall 71 and an inner edge of the radial wall 75.

The internal wall 73 of the insert may be formed with a uniformly curved concave surface having a radius greater than the radius of the outer wall, so that the internal surface is not spherical but becomes spherical upon deformation of the insert.

The edge 87 between the inclined wall and the first portion 75 of the inner surface contacts the outer surface 61 of the ball. As the insert is pressed against the ball into the recess 51, the inner portion of the insert radially expands to contact the sloping wall 21. Continued inward forcing of the insert causes the insert to slightly deform into the grooves 25 and 35, aiding in the locking of the insert into place. The 11° slope between the wall 21 and the axial direction 23 cooperates with the grooves in preventing the upward movement of the insert.

As the insert is deformed against the ball, the inner surface 85 of the insert becomes generally radial and abuts the surface 31 in the race. The inner surface 73 of the insert conforms to the spherical outer surface of the ball. The chamfer 83 along the outer surface of the insert becomes similar in shape to the chamfer 53 shown in FIG. 7A.

After assembly, the bearing is bumped or jarred to loosen the ball, and the bearing is ready for use.

The unique 11° angle and the grooves in the inner surface 19 of the race, and a close tolerance between the outer surface of the race and the diameter of the intersection 22 between the surface 21 and the outer surface 39 of the race, cooperate to prevent dislodgement of the insert after insertion.

Figure 11:
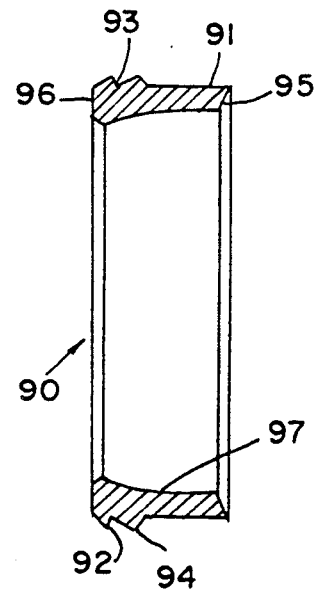
FIG. 11 is a detail of a preferred insert with ridges and a groove in an outer surface.

In a preferred embodiment as shown in FIG. 11, the cylindrical outer wall 91 of insert 90 has first and second ridges 92 and 94 and a groove 93 separating the ridges. When a ball 11 is placed against the tapered opening 95 and force is applied to wall 96, insert 90 deforms outward around ball 11 to receive the ball within curved interior surface 97, which forms a radius. The outer surface 91 is forced outwardly, contacting the inner sloping wall 51 of the race shown in FIG. 7A. Ridges 92 and 94 deform to fill grooves 52 and 54 in sloping wall 51. Groove 93 receives point 56 when the insert is expanded. The grooves and ridges on the insert and the grooves in the race greatly improves axial strength of the bearing assembly.

While the invention has been described with reference to specific embodiments, modifications and variations of the invention may be constructed without departing from the scope of the invention, which is defined in the following claims.

I claim:

1. A spherical bearing having an outer race body, an enlarged head on the race body, an opening in the head for receiving a ball, the opening having a first portion with a curved side for contacting and holding one side of a ball, and having a second sloped portion with an enlarged bore for receiving an insert for holding the ball, a deformable insert having a generally cylindrical shape with an outer surface and an inner surface, the outer surface deforming against the second sloped portion of the opening in the head and the inner surface deforming against the ball, the improvement comprising internal grooves in a wall of the second portion of the opening in the head for digging into the insert as the insert is expanded by pressure of a ball into the second portion of the opening.

2. The apparatus of claim 1, wherein the grooves comprise plural annular groove extending around the second portion of the opening.

3. The apparatus of claim 1, wherein the improvement comprises two or more grooves formed in a sloped wall of the second portion of the opening.

4. The apparatus of claim 3, wherein the grooves have generally radial faces and generally axial faces, with linear intersections between the faces forming edges for digging into the insert.

5. The apparatus of claim 4, wherein the sloping wall of the second portion of the opening, slopes inward from a face of the race and outward towards the first portion of the opening at about 11° to an axial line.

6. The apparatus of claim 1, wherein the plural annular grooves comprise plural grooves having generally radial walls, and sloped walls which slope at about 30° to an axial direction.

7. The apparatus of claim 6, wherein the grooves are spaced along the sloping wall of the second portion of the opening.

8. The apparatus of claim 1, further comprising one or more ridges and grooves in the outer surface of the insert.

9. The apparatus of claim 8, wherein the ridges on the insert cooperate with the internal grooves in the second portion of the opening to hold the insert ball and outer race head assembled as a spherical bearing.

10. Spherical bearing apparatus comprising a race having a ball-receiving opening made of two sections separated by a stepped outward annular lubrication groove, the first section having a radiused wall centered about a center of the opening for receiving a ball, and the second section having a sloped wall, sloping at about 11° or more with respect to a axis of the opening, and extending from an inner limit spaced radially outward from the lubrication groove, the sloped wall of the second section terminating outward at a face of the race, a ball for inserting in the opening and contacting the first curved surface of the first section of the opening, and an insert for inserting around the ball in the second section of the opening, the insert having a generally cylindrical outer surface and a curved inner surface for deflecting the outer surface radially outward into contact with the sloped wall of the second section of the opening as the insert is forced into the race and around the ball, and for deforming the inner surface of the insert to conform with the ball as the outer surface of the insert is forced outwardly into contact with the sloping wall of the second section of the opening.

11. The apparatus of claim 10, wherein the sloping line in the second section intersects an axial face of the race in a circular line, and wherein 0.0045" per side is allowed between a cylindrical wall of the insert and the circle at the inner section of the face of the race and the sloping wall.

12. The apparatus of claim 10, further comprising one or more ridges and grooves on the outer surface of the insert for deforming into the grooves in the sloped wall of the second section of the opening in the ball-receiving opening of the race.

* * * * *